United States Patent

Olson et al.

[11] Patent Number: 6,009,966
[45] Date of Patent: Jan. 4, 2000

[54] SNOWMOBILE FRONT SUSPENSION SYSTEM

[75] Inventors: Jerry A. Olson, Roseau; Richard H. Bates, Jr., Badger, both of Minn.

[73] Assignee: Polaris Industries Inc., Minneapolis, Minn.

[21] Appl. No.: 08/947,982

[22] Filed: Oct. 9, 1997

[51] Int. Cl.$^7$ ........................................... B62B 13/08
[52] U.S. Cl. .......................... 180/182; 180/190; 280/14.3
[58] Field of Search .................... 180/182, 186, 180/190; 280/14.3, 16, 22.1, 86.751, 86.754

[56] References Cited

U.S. PATENT DOCUMENTS

| | | | |
|---|---|---|---|
| 3,882,948 | 5/1975 | Southiere | 180/182 |
| 3,884,314 | 5/1975 | Callaway | 180/182 |
| 4,337,958 | 7/1982 | Witt et al. | 180/190 |
| 4,372,567 | 2/1983 | Yasui et al. | 180/182 |
| 4,489,954 | 12/1984 | Yasui et al. | 180/190 |
| 4,671,521 | 6/1987 | Talbot et al. | 280/16 |
| 5,029,664 | 7/1991 | Zulawski | 180/190 |
| 5,054,798 | 10/1991 | Zulawski | 180/182 |

FOREIGN PATENT DOCUMENTS

| | | | |
|---|---|---|---|
| 1227823 | 10/1987 | Canada | 305/38 |

*Primary Examiner*—Kevin Hurley
*Attorney, Agent, or Firm*—Fredrikson & Byron, P.A.

[57] ABSTRACT

A front snowmobile suspension of the type having left and right skis being secured to the chassis by left and right trailing arm ski suspension systems. The front end of the trailing arm includes a generally cylindrical sleeve for pivotably receiving the ski spindle. The top end of the cylindrical sleeve is located rearwardly of the bottom end, giving the sleeve and the ski spindle a rearwardly angled caster. The rear end of the trailing arm is pivotably secured to an adjustable link which in turn is secured to the chassis. The adjustable link is movable to change the caster of the cylindrical sleeve and the ski spindle.

5 Claims, 4 Drawing Sheets

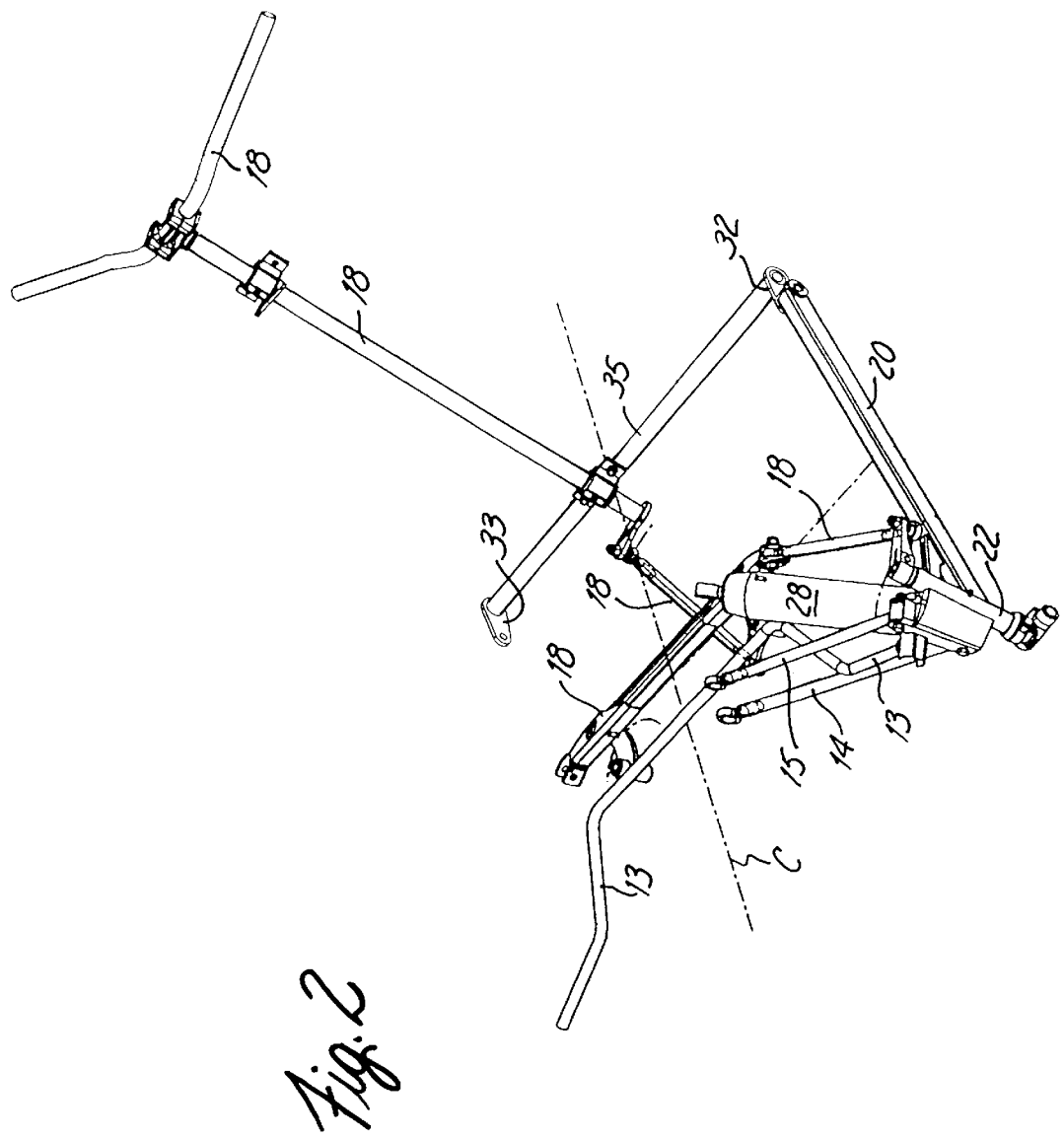

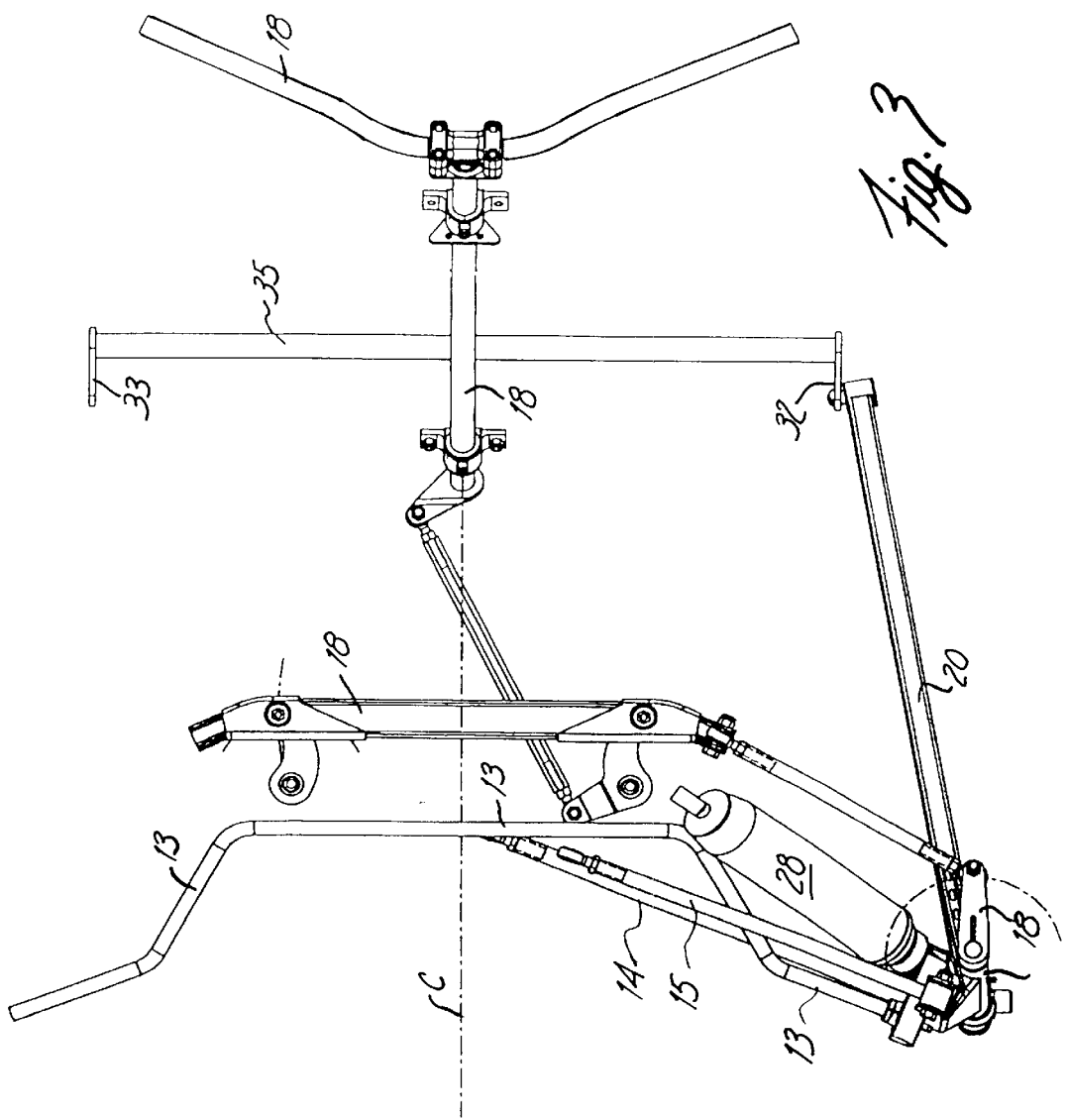

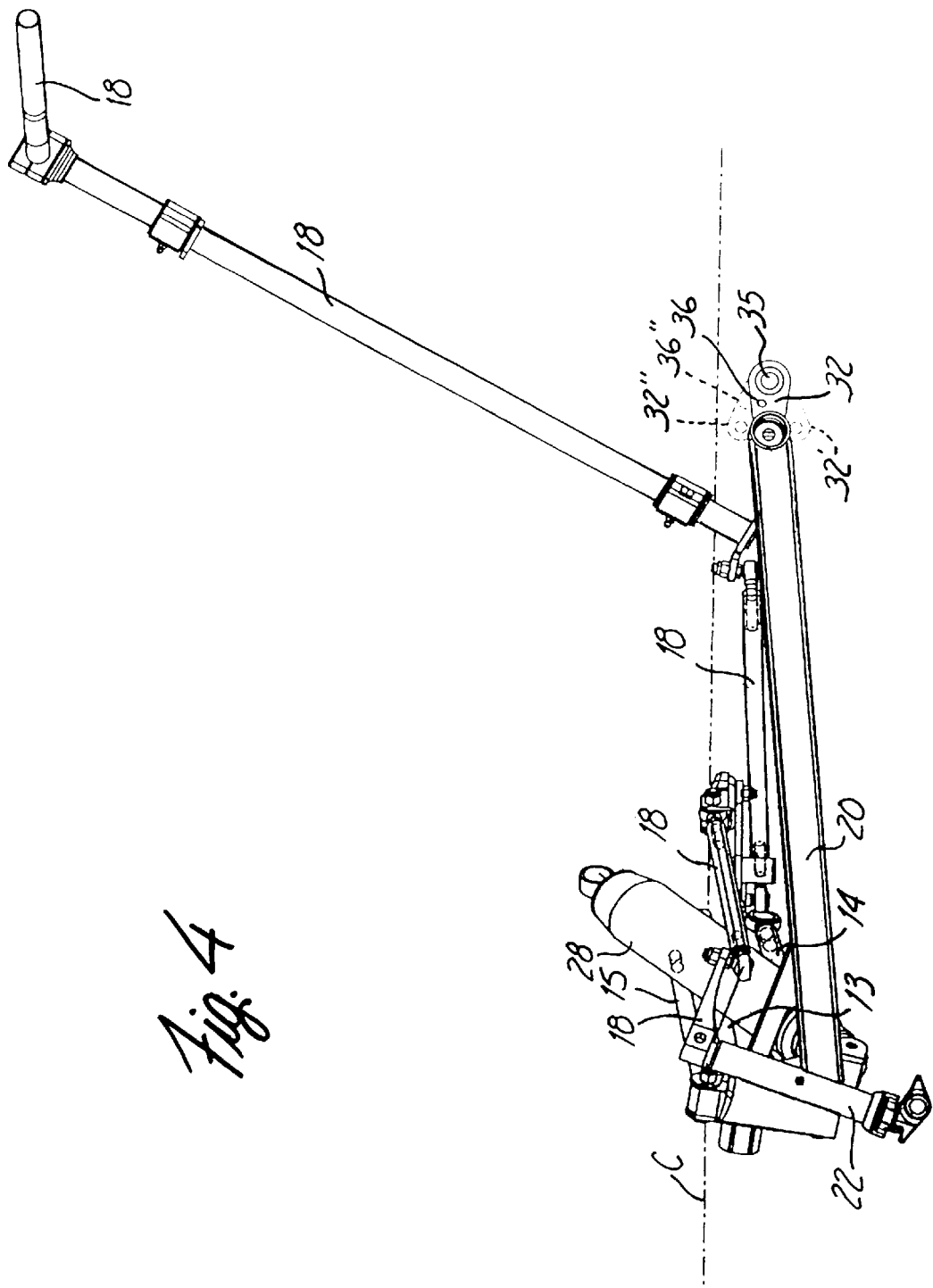

SNOWMOBILE FRONT SUSPENSION SYSTEM

TECHNICAL FIELD

The invention relates to snowmobile front suspension systems, and, in particular, to improvements in independent front suspension systems of the type employing a rear trailing arm.

BACKGROUND OF THE INVENTION

A variety of snowmobile ski suspension systems have been employed on snowmobiles over the years. In the early 1980's the assignee of the present invention introduced to the snowmobiling industry an independent front suspension system utilizing a trailing arm-i.e., an elongated arm having its front end connected to the steering spindle, and the rear end pivotably connected to the chassis (see, e.g., Canadian Pat. No. 1,227,823. The trailing arm is oriented generally parallel to the snowmobile's longitudinal centerline and generally parallel to the ground. The pivotal connection of the rear end of the trailing arm to the chassis is provided to permit the front end of the arm to move upwardly and downwardly as the ski encounters uneven terrain.

Under certain operating conditions snowmobile riders sometimes wish to adjust the performance characteristics of the front suspension system. For example, sometimes an operator will choose to use a shock/spring setup which permits less vertical travel of the front suspension. This modification can change the "at rest" or "normal" position of the front end of the trailing arm, and, therefore, cause a corresponding change in the caster of the ski spindle (which turns within the cylindrical sleeve carried at the front end of the trailing arm).

The caster of the ski spindle is significant, affecting both the performance of the front suspension and steering effort required. The ability of the suspension to efficiently absorb perturbances as the ski encounters moguls, bumps, etc. is increased as the caster angle is increased (i.e., as the top end of the ski spindle is tipped rearward), but steering effort is also increased-steering effort is reduced by making the ski spindle more vertical, but this sacrifices some of the performance of the suspension.

Thus, it would be desirable to permit a user to adjust the caster of the ski spindle when making other adjustments to the suspension system. The assignee of the present invention previously sold a limited production run of snowmobiles having two discreet mounting points for the rear end of the trailing arm. While permitting some adjustment of caster, the system required disconnection of the rear end of the trailing arm and provided only one alternative position for the trailing arm.

SUMMARY OF THE INVENTION

The invention provides a front snowmobile suspension of the type having left and right skis being secured to the chassis by left and right ski suspension systems. Each ski suspension system includes a ski spindle extending upwardly from a ski, the ski spindle being pivotably carried by the front end of a trailing arm. The front end of the trailing arm is pivotably secured to the chassis by a pair of generally transversely mounted radius rods which permit upward and downward movement of the front end of the trailing arm. The front end of the trailing arm includes a generally cylindrical sleeve for pivotably receiving the ski spindle. The cylindrical sleeve has top and bottom ends, the top end being located rearwardly of the bottom end, giving the sleeve and the ski spindle a rearwardly angled caster. The rear end of the trailing arm is pivotably secured to an adjustable link which in turn is secured to the chassis. The adjustable link is movable from a first position, in which the rear end of the trailing arm is located in a first position, to a second position in which the rear end of the trailing arm is located in a second position which is vertically lower than the first position. Movement of the adjustable link from its first position to its second position thus changes the caster of the cylindrical sleeve and the ski spindle.

BRIEF DESCRIPTION OF THE DRAWINGS

FIG. 2 is a perspective view illustrating the components of the front suspension of the invention;

FIG. 3 is a top view of the front suspension system shown in FIG. 2; and

FIG. 4 is a side view of the front suspension system shown in FIG. 2.

DETAILED DESCRIPTION OF THE INVENTION

Figure 1:
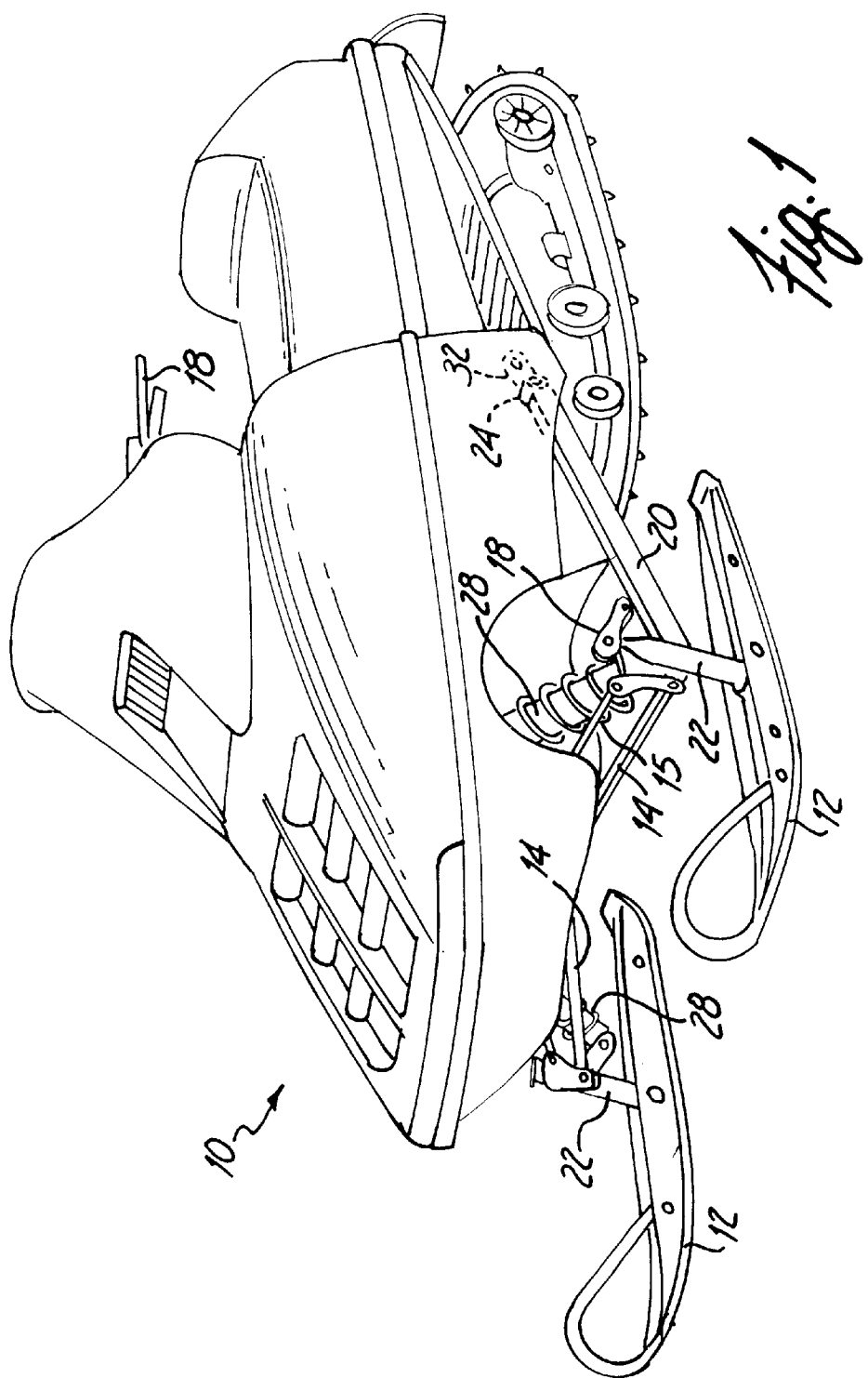
FIG. 1 is a perspective view of a snowmobile incorporating the front suspension of the invention.

FIG. 1 depicts generally a snowmobile having a front suspension of the invention, and FIGS. 2–4 provide further details regarding the components of the suspension. The chassis 10 of the snowmobile (concealed by body panels and other snowmobile components in FIG. 1) provides a basic framework to which the various components of the suspension system of the invention may be mounted. As indicated above, the suspension system is generally considered to be an independent suspension system since the left and right skis are permitted to move upwardly and downwardly generally independently of each other (in many cases, however, it is desirable to connect the two sides through a torsion bar 13, as is described in detail in the Canadian patent identified above). Thus, each side of the suspension system is essentially a mirror image of the other, and the following discussion of the system will be with reference to the left side of the system, as shown in detail in FIGS. 2–4.

The ski 12 is secured to an upwardly extending spindle. The spindle in turn is rotatably disposed within (and, in the drawings, concealed by) a generally cylindrical sleeve 22 carried at the front end of the trailing arm 20. The spindle is rotated by a steering linkage system (various components of which are identified by the common reference number 18 in the drawings) to cause the ski to turn in the desired direction.

The front end of the trailing arm 20 is linked to the chassis 10 by a pair of radius rods 14 and 15 which are oriented generally transversely to the centerline "C" of the snowmobile. The radius rods have pivotable joints on each end to permit the front end of the trailing arm 20 to move upward and downward. The rear end 24 of the trailing arm 20 is also pivotably mounted to the chassis (as described in further detail below) to permit the front end of the trailing arm 20 to move upward and downward. The combination of the radius rods 14 and 15 and the trailing arm 20 thus provide a geometrically stable mounting structure for the ski 12. A suitable shock absorber 28 and coil spring typically is connected from the front end of the trailing arm 20 to the chassis 10 to provide the suspension with the desired suspension characteristics.

To permit adjustment of the castor of the ski spindle, the rear end of the trailing arm 20 is pivotably secured to an adjustable link 32 which in turn is pivotably secured to the snowmobile chassis. The adjustable link 32, thus can be pivoted through a range of motion that moves the rear end 24 of the trailing am 20 up and down, thereby changing the caster of the cylindrical sleeve 22 and the ski spindle. An exemplary range of movement is illustrated in FIG. 4, which shows the adjustable link 32 in an intermediate position, and also shows in phantom lines a lower position of the link (32') and an upward position of the link (32"). Larger or smaller ranges of motion could also be provided, as desired.

In the preferred embodiment shown in the drawings the adjustable link 32 of the suspension system for the left ski is rigidly connected to the adjustable link 33 of the suspension system for the right ski. While such a connection can be accomplished in a variety of ways, in the preferred embodiment a generally transversely mounted bar 35. The bar connects the two links 32 and 33, and is rotatable around an axis that is generally transverse to the centerline "C" of the snowmobile. As it rotates, the bar 35 moves the adjustable links 32 and 33 to simultaneously position the rear ends 24 of the trailing arms 20 in the desired position to give the ski spindles the desired caster. Thus, the bar provides simultaneous adjustment of the two links 32 and 33 and assures that both sides always are adjusted to the same position. The links 32 and 33 and the bar 35 may be secured in the desired position by any suitable mechanism. For example, in FIG. 4 an additional hole 36 is provided in the link 32, and a suitable pin or bolt may be inserted through the hole 36 and through a selected corresponding hole in the chassis to secure the link 32 in the desired orientation. Alternately, a separate structure (such as a flange, lever, or other suitable configuration) may be secured to either the adjustable link or the bar to provide a point of connection for rotatably locking the position of the bar and adjustable links with respect to the chassis.

While a preferred embodiment of the present invention has been described, it should be understood that various changes, adaptations and modifications may be made therein without departing from the spirit of the invention and the scope of the appended claims.

What is claimed is:

1. A snowmobile comprising;
   a chassis, and left and right skis being secured to the chassis by left and right ski suspension systems, each such ski suspension system including:
   a ski spindle extending upwardly from the ski,
   a trailing arm having front and rear ends, the front end of the trailing arm including a generally cylindrical sleeve for pivotably receiving the ski spindle therein, the cylindrical sleeve having top and bottom ends, the top end being located rearwardly of the bottom end, giving the sleeve and the ski spindle a rearwardly angled caster, and
   a pair of radius rods, each radius rod having an inner end pivotably attached to the chassis and an outer end pivotably attached to the front end of the trailing arm;
   the rear end of the trailing arm being pivotably secured to an adjustable link which in turn is secured to the chassis, the adjustable link being movable from a first position, in which the rear end of the trailing arm is located in a first position, to a second position in which the rear end of the trailing arm is located in a second position which is vertically lower than the first position, movement of the adjustable link from its first position to its second position thereby changing the caster of the cylindrical sleeve and the ski spindle.

2. The snowmobile of claim 1 wherein the adjustable link for the left ski suspension system is rigidly connected to the adjustable link for the right ski suspension system.

3. The snowmobile of claim 1 wherein the adjustable link includes a first end pivotably secured to the rear end of the trailing arm and a second end pivotably secured to the chassis, the second end of the adjustable link for the left ski suspension system being rigidly connected to the second end of the adjustable link for the right ski suspension system by a generally transversely mounted bar.

4. The snowmobile of claim 3 wherein the transversely mounted bar is rotatable around a transverse axis to move the trailing arm from its first position to its second position.

5. A snowmobile comprising a chassis and left and right skis secured to the chassis by left and right ski suspension systems, each such ski suspension system including a trailing arm having front and rear ends, the front end of the trailing arm including a generally cylindrical sleeve for pivotably receiving a ski spindle therein, and the rear end of the trailing arm being pivotably secured to an adjustable link which in turn is secured to the chassis, the adjustable link being movable from a first position to a second position which is vertically lower than the first position, movement of the adjustable link from its first position to its second position changing the caster of the cylindrical sleeve and the ski spindle.

* * * * *